United States Patent [19]

Terada

[11] 3,758,256
[45] Sept. 11, 1973

[54] METHOD FOR PROCESSING A VITAL, FLAVOURED EGG

[76] Inventor: Kinji Terada, 40, Miyamaru-machi, Wahamatu-ku, Kitakyushu-shi, Fukuoka-ken, Japan

[22] Filed: July 21, 1971

[21] Appl. No.: 164,668

[30] Foreign Application Priority Data
July 25, 1970 Japan.............................. 45/064775

[52] U.S. Cl. ............................... 426/281, 426/300
[51] Int. Cl. ........................... A23b 5/00, A23l 1/32
[58] Field of Search ................... 99/113, 161; 119/1

[56] References Cited
UNITED STATES PATENTS
2,851,006  9/1958  Taylor et al. ........................... 119/1
3,120,834  2/1964  Goldhaft et al. ....................... 99/113
1,842,733  1/1932  Reynolds et al. ...................... 99/161

*Primary Examiner*—Raymond N. Jones
*Assistant Examiner*—Robert M. Elliott
*Attorney*—George B. Oujevolk

[57] ABSTRACT

The present invention relates to a method for processing a vital, flavoured egg with uniform distribution of the salt content therein, characterized by immersing an egg in a near-saturation salt water, having therein a non-ion surface active agent, applying pressure for a short time to make the salt penetrate the structure of the egg, lifting the egg out of the water and allowing it to stand still for at least 24 hours.

4 Claims, 12 Drawing Figures

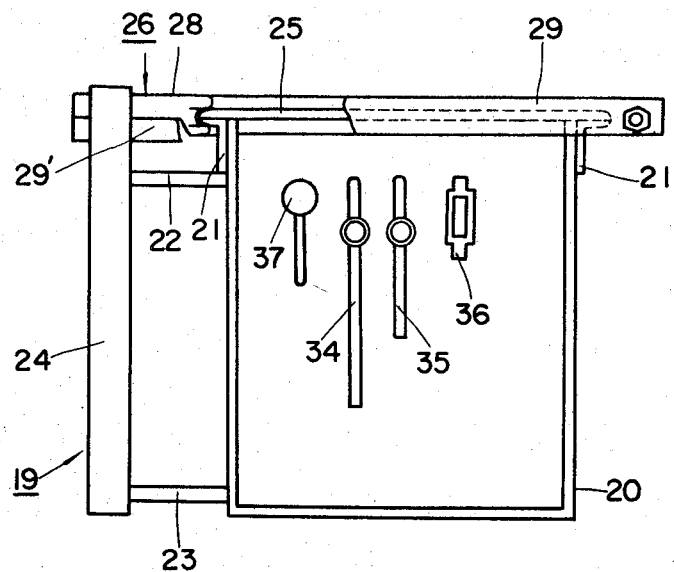
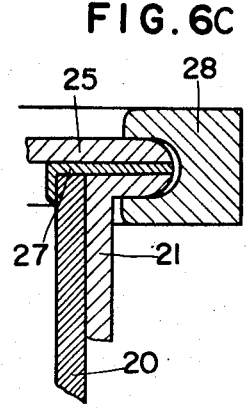

3,758,256

METHOD FOR PROCESSING A VITAL, FLAVOURED EGG

BACKGROUND OF THE INVENTION

The present invention has to do with a method for processing a vital, flavoured egg, characterized by flavouring an edible egg, like a hen's egg, with salt without impairing its vitality.

OBJECTS OF THE INVENTION

The primary object of this invention is to provide a method for offering a flavoured egg, said method being characterized by treating the egg in a short time without impairing its vitality or deteriorating the egg cells.

Another object of this invention is to provide a method for processing an egg, said method being characterized by utilizing the vitality of the egg itself to promote uniform distribution of salt therein.

Other objects of this invention will become apparent from the description referring to examples of executing the invention in conjunction with the attached drawings.

SUMMARY OF THE INVENTION

Generally speaking, the present invention contemplates a method for processing a vital, flavoured egg, characterized by washing the egg shell to make its pores clear of obstruction; immersing the washed egg in a high-concentration of salt water in a pressure vessel; pressurizing said egg in the salt water for a short time without impairing the vitality of the fresh egg, thereby impregnating it with salt water through its pores; lifting the egg out of said pressure vessel; removing the salt deposit on the egg; and, leaving the egg as it is for at least 24 hours, during which time the vitality of the egg itself promotes uniform distribution of salt.

The invention, as well as other objects and advantages thereof will become more apparent from the following detailed description when taken together with the accompanying drawings, in which.

DETAILED DESCRIPTION

Figure 1:
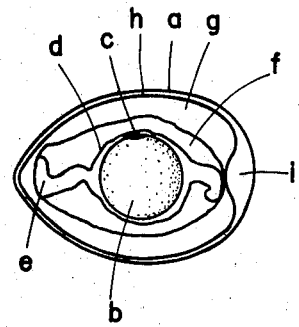
FIG. 1 is a diagram explaining the structure of an egg.

Traditional processed eggs include "Pi-tan" (fermented egg), "chian-tan" (soy-pickled egg), "chien-tan" (salted egg), and smoked egg.

The processing of all these eggs involves at least one step of keeping the eggs sealed for several tens of days in a processing medium; and when a large number of eggs are to be immersed in a pressurized salt water, they are commonly held under immersion for at least several tens of hours.

As is well known, the egg is enclosed in a shell (a) mainly composed of calcium carbonate. The shell (a) holds the yolk (b) at the center; the germinal spot (c) and the vitelline membrane (d) surrounding it; chalaza (e); thick and thin whites (f), (g); and shell membrane (h); and air space (i) at the end with a larger diameter. The shell (a) is perforated with countless pores, through which is supplied the air for maintaining the vitality of the cells which constitute the internal structure. If these pores are clogged, the molecular respiration of the internal cells will be suspended and as a result their vitality will be lost in at least 10 hours.

In the traditional processing of eggs, as mentioned hereinbefore, the eggs are kept sealed in the processing medium for several tens of days, or at least for several tens of hours. In this condition the shell pores are completely clogged and the internal cells, being cut off from the air supply, lose their vitality in the initial stage of processing. If they are then immersed in salt water, some of the cells will decompose and thereafter the activity of the so-called decomposing enzyme can be inhibited only by salt water which has osmotically replaced the water content of the egg. Therefore, a hard-boiled egg, after several tens of hours of immersion in pressurized salt water, will be different from a hard-boiled fresh egg; the former tastes salty, but emits a unique odor, which is supposed to come from the decomposition of the egg cells which have been deprived of vitality.

The present invention is aimed at eliminating the drawbacks of the traditional method of processing the eggs. Namely, the long time of treatment and the bad odor. Briefly stated, according to the present invention an egg is washed to clear the shell pores of obstructions; the cleaned egg is then immersed in a near-saturation salt water within a pressure vessel. During this short time immersion under pressure in the salt water which does not impair the vitality of the internal egg cells, the salt water penetrates the egg through the open pores; the salt deposit on the egg lifted out of the water is removed; and the egg thus processed is left for 24 hours, during which time the salt is uniformly distributed by the vitality of the egg itself.

First, 5 kg of salt is dissolved in 15 $l$ of a 30°C warm water to produce a high-concentration aqueous solution of salt with a specific gravity of about 1.25.

Two hundred fresh eggs are placed in a synthetic resin vessel full of said salt water and from the top a stainless steel net and a weight are put thereon to prevent the eggs from floating to the surface of the water. Then the vessel holding the immersed eggs is housed in a pressurizing tank to apply a compressed air of 5–7 kg/cm$^2$ for 40–60 minutes. After they are lifted out of the water, the eggs are immediately washed with cool water and dried with air blasting. The eggs thus processed turned out crackfree and the salt impregnation in the egg amounted to about 1.2 cc. When, in the above example, 35 g of a non-ion surface active agent for food, in the amount of two parts per 1000 parts of salt water, was added to the salt water, the salt water impregnation in about 40 minutes of pressure application amounted to 1.22 cc.

Investigation of salt distribution in hard-boiled eggs with a time lapse after immersion has revealed the following results. Immediately after being taken out of the pressurizing tank the eggs tasted salty only in the outer white and there was no salty taste at all in the yolk and its surrounding. In hard-boiled eggs wherein three hours elapsed after being taken out of the tank, the salty taste extended over the whole white, but failed to reach the yolk. After a five-hour lapse, however, the salty taste had reached the periphery of the yolk. After a ten-hour lapse, it extended over both the white and the yolk, but the flavour in the yolk was weak, as compared with that of the white. Only after a 24–hour lapse the eggs were flavoured evenly to a moderate taste. Meanwhile, investigations of hard-boiled eggs after 10 days, 20 days and 30 days of immersion verified that the eggs thus processed could remain vital, salted eggs.

Thus, in the processing method according to this invention, eggs are washed to make the pores clear of obstruction; the cleaned eggs are immersed in a near-saturation salt water for a short time which does not impair the vitality of the eggs; thereby the salt water penetrates the eggs through the open pores; and the eggs lifted out of the water are left as they are for at least 24 hours, during which time the vitality of the eggs themselves promote uniform distribution of salt. As a result, the eggs can be processed with their vitality not impaired and the function of fresh eggs preserved for a long time after processing; and they can be flavoured to a moderate salty taste in a short time.

Figure 2:
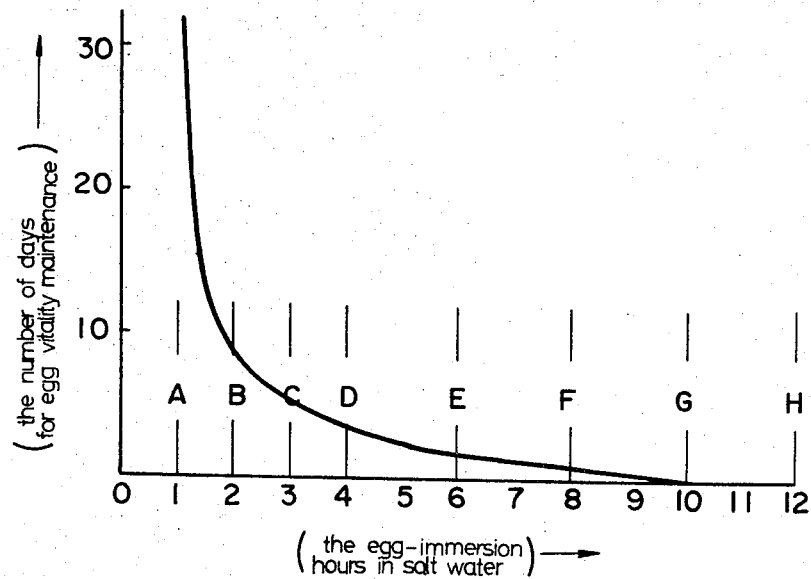
FIG. 2 is a graph illustrating the relation between the egg-immersion time in salt water and the number of days during which the vitality of the egg can be preserved.

Generally speaking, the egg immersion time, in other words, the time during which the shell pores are closed, and the number of days during which the egg vitality can be maintained are in the relationship as illustrated in FIG. 2, which shows that if the pores are closed for less than one hour, the egg's vitality is hardly affected, but when one hour is exceeded, the number of days for egg vitality maintenance sharply drops and a pore closure lasting about 10 hours will result in a total loss of egg vitality. Thus, the appropriate egg immersion time would be less than one hour. When a fresh egg is left untreated, the loss of its vitality will be immediately followed by decomposition; but an egg which has been processed by the method of this invention can be preserved without decomposition for a considerable number of days by virtue of the impregnated salt even after its vitality has been lost. In this example, the processed egg was found to have its yolk hardened but not decomposed, even after a lapse of two months.

According to the present invention, the salt water is nearly saturated with salt and this makes it possible to limit the penetration of salt water into the shell to a necessary minimum and shorten the immersion time, thereby minimizing the influence on the internal egg structure. Moreover, as means for shortening the immersion time, the processing pressure is raised to such an extent that the egg is not adversely affected (thereby the air space within the egg is contracted); and, as shown in the above example, a surface active agent for food is added to decrease the surface tension, thereby promoting the salt impregnation speed. Further, the salt water for egg immersion may have vitamins or seasoning preparations added; particularly a vitamin-fortified egg will have an increased value as food.

Figure 3A:
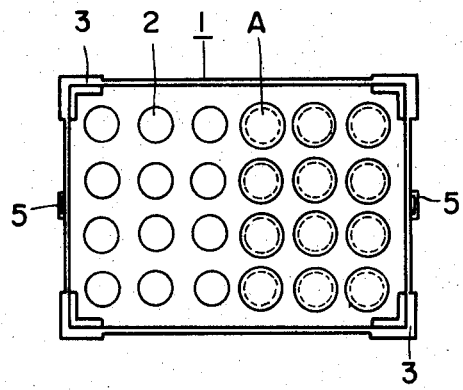
FIGS. 3A, 3B, 3C are respectively a plan view and an elevation view of a single egg-holding frame for egg arrangement, and an elevation view of a stack of such egg-holding frames.
Figure 3C:
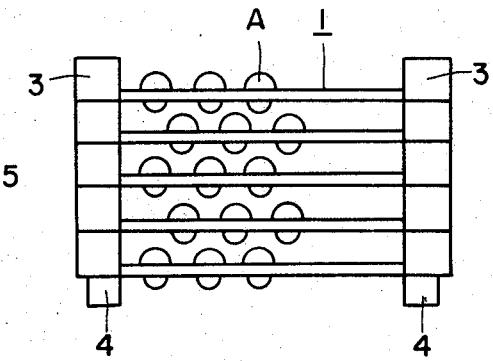
Figure 3B:
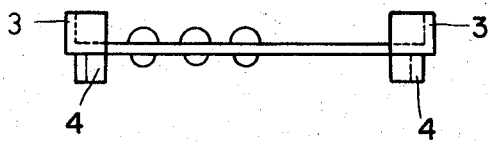

Next the equipment for execution of the present invention will be described in conjunction with examples illustrated in FIG. 3 and succeeding figures.

In FIGS. 3A to 3C, 1 is a synthetic resin frame with numerous holes 2 to receive eggs (A), said frame having angular projections 3, 4 at the four corners of the top and bottom that fit together. Thus, as illustrated in FIG. 1C, this egg-arranging frame 1 can be stacked in multiple layers. Thereby an appropriate handle 5 attached thereto would be convenient for portability and a designing of this frame 1 in the same size as the commercially available egg-tray would make it easy to transfer eggs from the frame to a tray by simply piling the two and turning them over, without touching the eggs with the hand. A stack of egg frames 1 can be fastened together by applying a fastening band or insertion bolt to the handle 5 on both sides or providing a simple lock easy to fit or unfit to the top and bottom angular projections 3, 4.

Figure 4B:
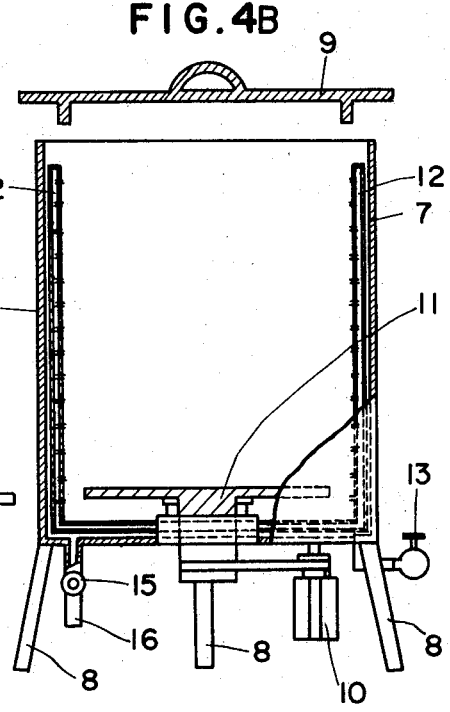
FIGS. 4A and 4B are similarly a plan view and an elevation view of an egg-washer.
Figure 4A:
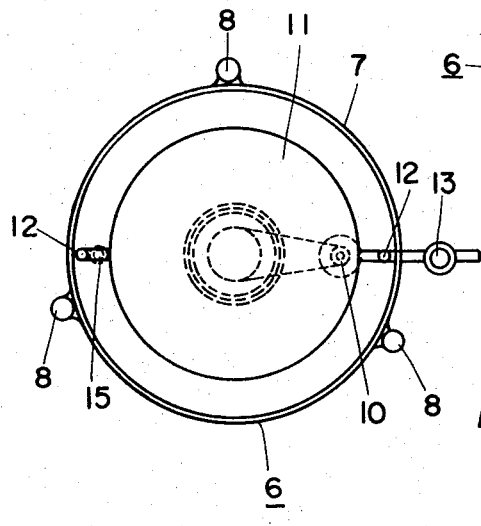

FIGS. 4A and 4B, 6 is a washing device composed of: a vessel 7 which can wholly house a fastened stack of egg frames 1, support legs 8 and a cover 9. Centrally in the vessel 7 is held a turntable 11 driven by a motor 10; and on the periphery of this turntable stand are an adequate number of pressurized water jet pipes 12 perforated with countless small holes. Also there is a control cock 13 provided in the water supply pipe 14 for supplying fresh water to the jet pipes; and a drain cock 15 is provided in the exhaust pipe 16 opening at the bottom of said vessel 7.

Thus, when a stack of egg frames 1 is placed on the turntable 11 within the vessel 7 and the vessel is sealed with the cover 9 and then the motor 10 is started with the control cock 13 opened, the egg frames 1 will turn and at the same time the surrounding jet pipes 12 will emit a uniform jet of pressurized water upward and downward, thereby washing the eggs on the frames 1 in a short itme; thus the shell pores will be cleaned of any obstruction.

Figure 5A:
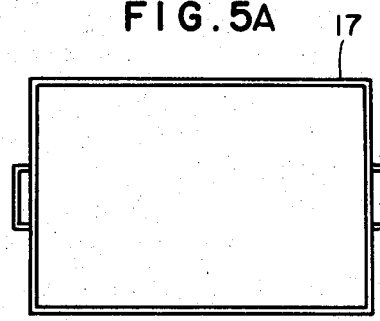
FIGS. 5A and 5B are respectively a plan view and an elevation view of a salt water tank; and, FIGS. 6A, 6B, 6C are respectively a plan view, an elevation view and a partial sectional view of a pressurizer used herein.
Figure 5B:
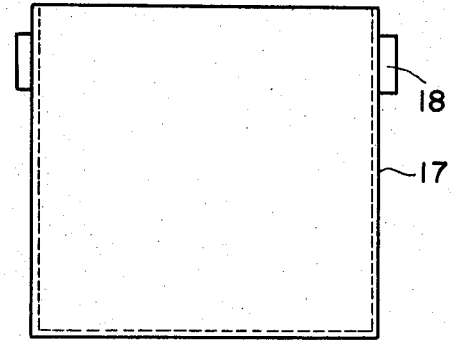

In FIGS. 5A and 5B there is a salt water immersion tank 17 in which the stack of egg frames 1 lifted out of said washing device 6 is placed for immersion in salt water. This tank has a handle 18.

Figure 6A:
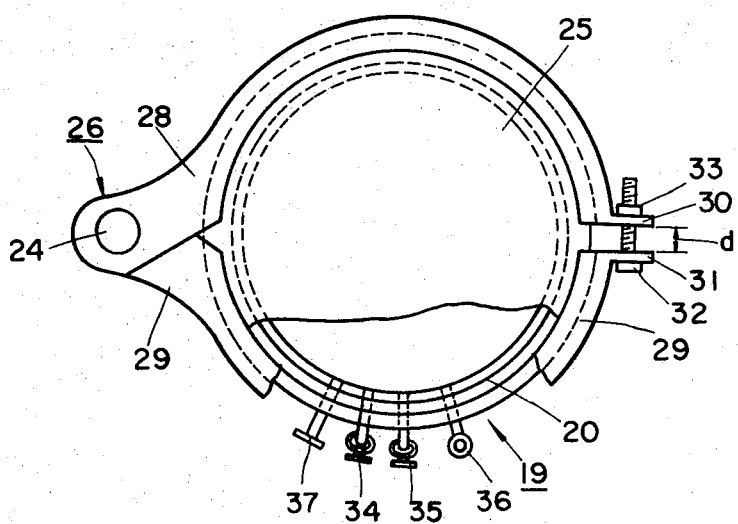

In FIGS. 6A to 6C there is a pressurizing device 19, in which said salt water immersion tank 17 holding the egg frames 1 is sealed and a pressurized air is supplied to impregnate each egg on the frame 1 with salt water. The composition of this pressurizing device is as follows: there is a rust-proofed pressure vessel 20 reinforced with a flange 21 around the top opening and it is fixed to the supporting stem by means of top and bottom connecting rods 22, 23; 25 is a cover which overlaps said flange 21 and seals the opening of the pressure vessel 20; 26 is a metal clamp which, as shown in FIG. 6C, clamps together this cover and said flange 21 through the packing 27. Said metal clamp consists of right and left clamp pieces 28, 29, with their base pivoted to said support stem 24 and their forward tips following the contour of said flange 21 in a nearly semicircular fashion. As seen from FIG. 6C, each clamp piece 28 or 29 has such a cross-section that on its inside said flange 21, said packing 27 and said cover 25 are able to fit together in a clamped state. Moreover, each clamp piece 28 or 29 terminates in a bend 30 or 31 with a gap (d); 32 and 33 are a bolt and nut which are provided to pass through said bends 30, 31 and link these clamp pieces 28, 29; 34 in an air supply pipe to supply compressed air to said pressure vessel 20; 35 is an air exhaust pipe; 36 is a pressure control valve; and 37 is a pressure gauge.

Thus, in this pressurizing device, at first the salt water immersion tank 17 shown in FIGS. 5A and 5B is placed in the pressure vessel 20; the tank is filled with half the amount of a high concentration of salt water; after being washed, a stack of egg frames 1 is immersed in the salt water and then the balance of the salt water is added in the tank. The egg frames 1 and the eggs therein (A) will tend to float, but they will be submerged under water by means of a holding board, etc. Eggs (A) which tend to float on the frame 1 will not be able to escape out of their holes 2, being prevented from moving by the frame 1 on top. Next the cover 25 is set and then, as indicated in FIG. 4C, the overlap portion of this cover 25 with the flange 2, together with the packing 27, is clamped between right and left clamp pieces 28, 29 and then tightened with the bolt and nut 32, 33 provided between the bends 30, 31, thereby making an airtight seal of the pressure vessel 20 and the cover 25. A narrow gap (d) may be left between the bends 30, 31, but it is obvious that there can be no leak of compressed air from this part. Thereafter, air, pressurized to about 5-7 kg/cm² is supplied through the pipe 34 to apply a pressure on the surface of the salt water for about 40 to 60 minutes. Thus, a high-concentration salt water penetrates the egg (A) via the pores. After a lapse of specified time, the exhaust pipe 35 is opened and, contrary to the above procedure, the cover 25 is removed and the egg frames 1 are quickly lifted out of the tank 17 and again placed in the washing device 6 to wash the eggs to remove the salt deposit thereon. Next, air is blasted onto the egg frames 1 to dry the latter; thereby a drier may be built into the washing device 6 to render the latter available both for washing and for drying. With the above operation the procedure of salt impregnation is finished. Thereafter, when a partition board for a commercial egg tray is placed on a separated egg frame 1 and the whole thing is turned upside down, the eggs will move into recesses on the partition board. Thus, the eggs can be instantly packed in the egg trays and shipped out.

In the salt-impregnated eggs thus obtained, the vitality of the egg itself promotes uniform distribution of salt during the steps subsequent to the lifting out of the tank 17 or during shipment and the eggs become vital, flavoured eggs.

In the examples mentioned hereinbefore, a salt water immersion tank 17 is adopted, but this may be omitted and instead, the pressure vessel 20 of the pressurizing device 19 may be directly filled with salt water.

I claim:

1. A method for processing a vital, flavoured egg, comprising the steps of; washing the egg shell to make its pores clear of obstruction; immersing the washed egg in a a nearly saturated solution of salt water in a pressure vessel, said salt water having a non-ion surface active agent therein; pressuring said vessel with said egg in the salt water for a period of time sufficient for the salt to impregnate said egg and without impairing the vitality of the fresh egg; lifting said egg out of said pressure vessel; removing the salt deposit on the egg; and leaving the egg stand for at least 24 hours, during which time the vitality of the egg itself promotes uniform distribution of salt.

2. A method claimed in claim 1, wherein the time of eggs staying in the salt water is about 40 to 60 minutes and the pressure in the vessel is 5-7 kg/cm².

3. A method claimed in claim 1, wherein at least one of seasoning preparations, vitamins or spices is added to the said salt water.

4. A method as claimed in claim 1 wherein said non-ion surface active agent is present in the amount of about two parts per one thousand part of water.

* * * * *